Patented Dec. 18, 1951

2,579,429

UNITED STATES PATENT OFFICE 2,579,429

SULFUR COMPOSITION

Oscar H. Hammer, South Haven, Mich., assignor to The Dow Chemical Company, Midland, Mich., a corporation of Delaware No Drawing. Application February 2, 1949, Serial No. 74,238

2 Claims. (Cl. 167—20)

This invention relates to sulfur compositions and is particularly directed to parasiticidal mixtures including sulfur and 4-chlorophenyl 4-chlorobenzene sulfonate.

Sulfur has been widely employed as a parasiticidal toxicant for the control of fungous diseases on living plants. In such use, its action has been established as being relatively specific, with little or no control being accomplished of plant insect and mite pests. This characteristic of sulfur and similar specificities for other parasiticidal materials frequently has necessitated a multiplicity of applications to plant surfaces where mixed infestations of insect, mite and fungous pests occur. The employment of combinations of toxicant materials on foliated plants has not always been satisfactory due to the tendencies of sulfur and sulfur compounds to react with other parasiticides to form products having phytotoxic properties. Also many toxicants are antagonistic so as to lose much of their effectiveness in mixtures.

It has been proposed to employ sulfur in combination with insecticidal and miticidal materials as dormant and delayed dormant applications to trees prior to their foliation. In such operation, the phytocidal properties of the compositions would not be important because of the absence of leaves. This practice, however, has not been particularly successful, since many of the organisms for which control is sought do not become a problem until leaves appear, by which time residues of the supplementary toxicant are largely dissipated. Also, the need for application of sulfur and other fungicidal materials is not confined to the dormant and delayed dormant periods. The necessity for efficient control of scab, mildew and related fungal infections continues on thru much of the growing season both as regards trees and field crops.

In accordance with the present invention, it has been discovered that sulfur may be combined with 4-chlorophenyl 4-chlorobenzene sulfonate to obtain a parasiticidal composition having very desirable properties for the control of both fungus and mite organisms. In such mixture there appears to be no chemical reaction between the toxic constituents, and the toxicants appear to be mutually activating so that a greater than additive effect is accomplished as regards control of mite organisms. A further advantage resides in the prolonged residual effect exerted by the mixture against mite eggs. Thus a single application of the mixture, compounded with a suitable carrier in spray or dust composition, gives excellent control of such organisms as *Paratetranychus pilosus* (European red mite), *Tetranychus bimaculatus* (two-spotted spider mite) and *Bryobia sp.* for periods ranging up to several months. This is true even when the mixtures are applied during the dormant season. Also, sprays and dusts comprising the combination of toxicants in the amounts required to accomplish the desired control, do not appear to cause injury to either leaves or fruit. The great potential value of the mixtures would appear evident particularly for the treatment of orchard crops such as apples, pears, plums, peaches and prunes; field crops such as beans, melons and cotton; and ornamentals such as roses and evergreens.

In operating in accordance with the present invention, the new toxicant mixtures may be employed with any suitable carrier in the form of spray and dust compositions. Also, a mixture of the toxicants may be so compounded as to produce concentrates adapted subsequently to be used in the preparation of spray or dust mixtures.

In the preparation of sprays, the sulfur and 4-chlorophenyl 4-chlorobenzene sulfonate may be separately dispersed in the water or other carrier. Alternately, the toxicants may be mixed one with the other and the resulting mixture dispersed in water or other liquid carrier. A further mode of operation includes grinding and mixing the toxicants with bentonite, diatomaceous earth, or talc and dispersing the resulting mixture in water. Any compatible wetting, dispersing or wetting agent may be employed in the spray formulations.

In the preparation of dusts, the sulfur and 4-chlorophenyl 4-chlorobenzene sulfonate may be ground or mixed with the finely divided carrier in any suitable manner. Operable carriers include diatomaceous earth, clays, talc, charcoal, wood flour, pyrophyllite, volcanic ash and the like. Also, an excess of sulfur may serve as the body of the dust composition.

Where a concentrate is desired, the mixture of toxicants may be ground or otherwise dispersed with wetting and dispersing agents to obtain products adapted to be dispersed in water or other aqueous spray compositions. Alternately, the toxicants may be separately compounded in concentrate form and mixed together upon dilution in the spray tank or otherwise.

Wetting, emulsifying and dispersing agents adapted to be employed in various of the compositions as suggested above include sodium lauryl sulfate, di-octyl sodium sulphosuccinate (Aerosol OT), polyethylene glycol-phenyl-isooctyl ether (Triton X-100), polyoxyalkylene derivatives of sorbitan trioleate (Tween 85), sulfite pulping waste materials, etc., provided only that such agent accomplish the end desired and not be reative with the other ingredients of the composition.

Any suitable proportions of sulfur and 4-chlorophenyl 4-chlorobenzene sulfonate may be employed in combination, and the exact amounts do not appear to be critical. In spray compositions, the combining proportions of toxicants and dosages applied should be so integrated that the content of sulfur is at least about 4 pounds per 100 gallons and the content of 4-chlorophenyl 4-chlorobenzene sulfonate at least about 0.05 pound per 100 gallons. In dust mixtures, much higher concentrations may be employed ranging from about 5 to 99 per cent by weight of sulfur and from about 1 to 10 per cent by weight of 4-chlorophenyl 4-chlorobenzene sulfonate. In concentrates, the mixture of toxicants may constitute from about 5 to about 95 per cent by weight of the ultimate composition.

The compound 4-chlorophenyl 4-chlorobenzene sulfonate is a white crystalline solid melting at 81°–83° C.

The following examples illustrate the invention but are not to be construed as limiting.

*Example 1*

40 parts by weight of 4-chlorophenyl 4-chlorobenzene sulfonate was mechanically mixed with 1.5 parts of alkyl aryl sulfonate (Nacconal NR), 2 parts of sodium arylalkyl sulfonic acid product (Daxad No. 27) and 56.5 parts of attapulgite clay (Diluex) to form a concentrate identified as "Composition A."

This composition was employed in water dispersion as a delayed dormant spray in combination with a commercial wettable sulfur mixture hereinafter termed "Composition B" and consisting of 96.0 per cent by weight of finely divided sulfur and 4 per cent of wetting and dispersing agents and inerts. Similarly each of Compositions A and B were employed separately in dormant and delayed dormant applications.

The application of the combination of toxicants was made to apple trees of the Red Delicious variety at a time short prior to blooming. The trees were heavily infested with eggs of both two-spotted spider mite and European red mite and immediately adjacent to unsprayed check plots which provide a continuous source of reinfestation.

The mixture applied consisted of an aqueous dispersion of 2.5 pounds of Composition A and 8 pounds of Composition B per 100 gallons of spray. Application was accomplished with conventional spray rigs and in such dosage as to provide for appreciable run-off from all tree surfaces. 90 days after application, the foliage of the trees of the sprayed plots and of check plots was subjected to randomized sampling, and the individual leaves examined to determine the existent mite populations. On the treated trees, a population of only 19 live mites per 50 leaves was found. On the check trees, an average population of 2,000 mites per 50 leaves was observed.

In a similar operation, Composition A at 5 pounds per 100 gallons of aqueous spray was applied as a dormant application to Red Delicious apple trees. After 90 days, randomized sampling and examination of leaves indicated a mite population of 113 mites per 50 leaves.

The sulfur "composition B" in dormant application was applied alone in aqueous dispersion at the rate of 5 pounds per 100 gallons with 5 applications spaced several days apart, so that the trees received a total dosage of 25 pounds of sulfur. 90 days following the initial application, the foliage of the treated trees was found to have an average infestation of 6,112 mites per 50 leaves.

Incidental to the excellent control of mite infestation attributable to the application of the mixture of toxicants, control of apple scab and other fungous infections was also accomplished. The toxicant mixture did not cause any tree injury, and the foliate of the trees treated therewith was not subject to the discoloration and loss of vigor from mite attack which characterized the trees in the check plots.

*Example 2*

In a similar fashion, aqueous dispersions of Compositions A and B were applied as summer sprays to completely foliated and bearing Red Delicious apple trees heavily infested with European red mite and two-spotted spider mites. Here again, conventional spray equipment and practices were followed. The following table sets forth the results observed upon randomized sampling and inspection of the foliage of both sprayed and check trees:

| Pounds Composition per 100 gallons spray | | Average number mites per 50 leaves after interval of— | |
|---|---|---|---|
| Composition A | Composition B | 7 days | 16 days |
| 2.5 | | 36 | 22 |
| 2.5 | 4 | 22 | 14 |
| | 4 | 2,492 | 1,948 |
| | 8 | 2,064 | 1,900 |
| (Check) | | 2,156 | 1,416 |

5 pounds of Composition A per 100 gallons applied in dormant application to plots in the same orchard, controlled the mites to the extent that randomized 50 leaf samples from such treated trees showed an average mite count of 113.

No foliage injury resulted from the application of the mixed toxicants, and the trees treated therewith remained lush and green throughout the balance of the growing season. The trees from check plots and those sprayed with sulfur alone were in part defoliated and extensively damaged by the mites.

I claim:

1. A composition for the control of mites and spider mites comprising sulfur and 4-chlorophenyl 4-chlorobenzene sulfonate in such proportions as to be mutually activating, and in which the 4-chlorophenyl 4-chlorobenzene sulfonate is present in the amount of at least one percent by weight of the combined weights of 4-chlorophenyl 4-chlorobenzene sulfonate and sulfur.

2. An aqueous spray composition for application to tree and plant surfaces to control mites and spider mites comprising a dispersion of 4-chlorophenyl 4-chlorobenzene sulfonate and sulfur in association with a finely divided solid carrier and a wetting and dispersing agent, and in which the 4-chlorophenyl 4-chlorobenzene sulfonate is present in the amount of at least one percent by weight of the combined weights of 4-chlorophenyl 4-chlorobenzene sulfonate and sulfur.

OSCAR H. HAMMER.

REFERENCES CITED

The following references are of record in the file of this patent:

UNITED STATES PATENTS

| Number | Name | Date |
|---|---|---|
| 2,119,125 | Anthony | May 31, 1938 |
| 2,145,259 | Heath | Jan. 31, 1939 |
| 2,414,216 | Wean et al. | Jan. 14, 1947 |

OTHER REFERENCES

Lauger et al., Helv. Chim Acta., vol. 27, pp. 896–908, June 1944 (see particularly page 902).

Metcalf, J. Econ. Ent., vol. 41, No. 6, pp. 875–882 (see p. 878) 167–DDT.